United States Patent [19]
Tanaka

[11] Patent Number: 5,186,959
[45] Date of Patent: Feb. 16, 1993

[54] PELLET MAKING MACHINE FOR PRODUCING PELLETS FROM A STRAND

[75] Inventor: Masaru Tanaka, Higashi Katsushika, Japan

[73] Assignee: Katsu Manufacturing Co., Ltd., Chiba, Japan

[21] Appl. No.: 818,098

[22] Filed: Jan. 8, 1992

[30] Foreign Application Priority Data

Jun. 19, 1991 [JP] Japan ................... 3-77262

[51] Int. Cl.[5] .............................................. B29B 9/06
[52] U.S. Cl. ...................................... 425/215; 83/171; 83/950; 264/143; 425/315; 425/DIG. 230
[58] Field of Search ............... 264/143; 425/215, 216, 425/315, 316, DIG. 230; 83/102, 105, 106, 170, 171, 950; 165/86

[56] References Cited

U.S. PATENT DOCUMENTS

| | | | |
|---|---|---|---|
| 2,399,894 | 5/1946 | Schulz | 425/215 |
| 3,171,159 | 3/1965 | Cunder et al. | 425/215 |
| 3,583,267 | 6/1971 | Topolski et al. | 83/171 |
| 3,753,637 | 8/1973 | Gasior et al. | 83/171 |
| 3,776,675 | 12/1973 | Veneria | 425/215 |
| 4,053,013 | 10/1977 | Guba | 165/86 |
| 4,333,371 | 6/1982 | Matsuda | 83/171 |
| 4,413,965 | 11/1983 | Kinoshita et al. | 264/143 |
| 4,530,649 | 7/1985 | Philipp et al. | 425/215 |

Primary Examiner—Jay H. Woo
Assistant Examiner—James P. Mackey
Attorney, Agent, or Firm—Wenderoth, Lind & Ponack

[57] ABSTRACT

A pellet making machine used in a pellet producing process has a rotary cutter mounted to the outer periphery of a hollow rotary shaft. A fixed blade is disposed opposite to the rotary cutter, and a pellet exhaust chute is disposed below the rotary cutter and slopes downwardly therefrom. The rotary cutter is provided with an interior cooling chamber and the hollow rotary shaft is provided with water inflow holes and exhaust holes communicating with the cooling chamber of the rotary cutter. A water supply tube extends into the hollow rotary shaft and is supported within the shaft by a partition wall, which also forms a water supply passage communicating with the water inflow holes of the hollow rotary shaft and a water exhaust passage communicating with the water exhaust holes of the hollow rotary shaft. A bad pellet drop cylinder is disposed along the sloping face of the pellet exhaust chute, and a guide cover is pivotably mounted for opening and closing movement on the upper entrance of the bad pellet drop cylinder.

8 Claims, 4 Drawing Sheets

PELLET MAKING MACHINE FOR PRODUCING PELLETS FROM A STRAND

BACKGROUND OF THE INVENTION

1. Field of the Invention

This invention relates to a pellet making machine for producing pellets from a strand by cutting a strand formed and extruded from a die mounted on a head of an extruder with a cooled rotary cutter.

2. Description of the Prior Art

Conventionally, in a known device for producing pellets, the pellets are produced by cutting a strand cooled in a water reservoir by a fixed blade and a rotary cutter mounted on a pellet making machine.

However, the rotary cutter generates heat by cutting the strand, and the temperature of the rotary cutter rises, thereby providing inaccurate cutting of the strands. The cutting of the rotary cutter gradually becomes impossible.

In other words, the rotary cutter generate heat, and synthetic resin in the materials of the strands sticks to the rotary cutter and the fixed blade, thereby providing a poor cutting force and nonuniformity of the cutting size of the pellets. Furthermore, static electricity occurs, thereby adhering the pellets in lumps to each other.

In the known pellet making machine, a plurality of strands extruded from the extruder are passed through the cooling reservoir to cool them sufficiently, and are then cut by the rotary cutter into pellets. Thereafter, the hot cut pellets are thrown into the water reservoir for cooling the pellets.

When the strands are fed and cut for producing pellets by cutting strands at the first stage, the shape of the pellet is not constant and the nonuniform pellets are formed, thereby providing bad products.

SUMMARY OF THE INVENTION

Therefore, an object of the present invention is to provide a pellet making machine for producing pellets from a strand which can easily cut strands extruded from an extruder by a cooled rotary cutter to produce pellets of uniform size and shape.

According to the present invention, the pellet making machine installed in a pellet making process is provided with a rotary cutter having a cooling chamber communicated with water inflow holes and exhaust holes formed in a hollow rotary shaft, strands extruded from a die mounted in a head of an extruder are cut by the rotary cutter, cooled and prevented from heating by supplying water, thereto rotary cutter is prevented from adhering to the synthetic resin of the material of the strand increasing the effeciency of cutting and the durability, of the machine. Static electricity caused in the rotary cutter is eliminated to provide easy handling of pellets. Furthermore, a bad material drop cylinder is formed along a slant face of a pellet exhaust chute, and a guide cover is pivotably mounted for opening and closing movement on the upper portion of the bad material drop cylinder in such a manner that bad materials nonuniform shape, produced at the beginning of cutting are not fed into the pellet exhaust chute and are not mixed into the pellets of goods quality.

BRIEF DESCRIPTION OF THE DRAWINGS

The accompanying drawings illustrate one embodiment of a pellet making machine for producing pellets from a strand according to this invention, wherein.

DETAILED DESCRIPTION OF THE PREFERRED EMBODIMENT

One embodiment of the pellet making machine for producing pellets from a strand will be hereinafter described in detail with respect to the drawings of FIGS. 1-7.

Figure 1:
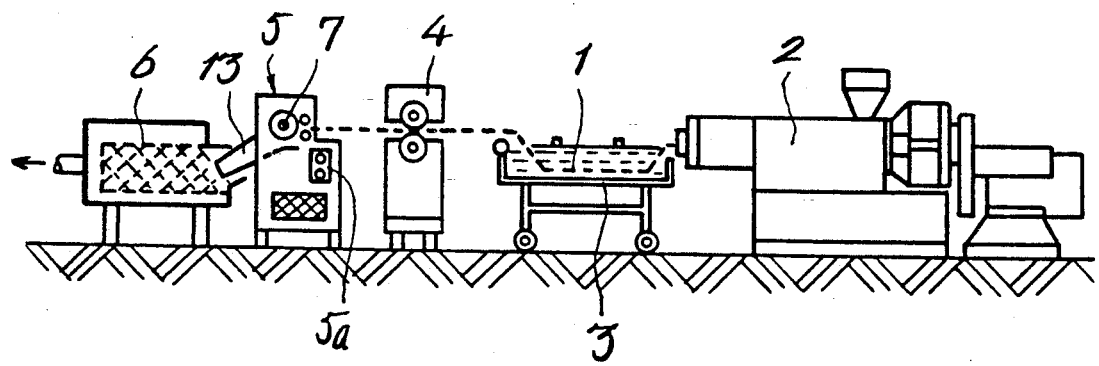
FIG. 1 is a diagram showing processes in a pellet making machine.

FIG. 1 shows an entire installation using a pellet making machine according to this invention. The installation is provided with an extruder 2 to extrude and form a strand 1, a cooling reservoir 3 to cool the extruded strand 1, a drain blower device 4 to drain the cooled strand 1, a pellet making machine 5 according to this invention, and a rotary type sieve device 6 connected continously to the pellet making machine 5. The strand 1 is cut by a rotary cutter 7 and a fixed blade 9 in the pellet making machine 5 according to this invention, and these cut pellets are sieved and arranged by the rotary type sieve device 6 so that the pellets can be taken out.

The Pellet making machine 5 is provided with an operating panel 5a on a front portion and for a chamber 8 to receiving the rotary cutter 7a top portion. The chamber 8 is provided with an exhaust chute 13 of a U-shape in cross-section located at a lower portion of the rotary cutter 7, and the exhaust chute 13 extends at a slant in downward direction.

Further, the chamber 8 is provided inside with an upright leg 9a extending vertically in the upward direction, and the upright leg 9a is provided at an upper portion thereof with a fixed blade 9 opposed to the rotary cutter 7. The blade 9 and cutter 7 are arranged opposite to each other in such a manner that the cutter 7 is rotatable, but the blade 9 is stationary.

A feed roller 10 is disposed in front of the fixed blade 9 within the chamber 8 is provided with a rough face on the outer surface thereof, and is supported by a rotary shaft 10a having a pulley 10b mounted at an end thereof. A press roller 11, supported by a rotary shaft 11a, is disposed above the feed roller 10 in contact with said feed roller 10A delivery roller 12 for removing the strand 1 from the drain blower 4 is disposed in front of the feed roller 10 and the press roller 11.

A receiving plate 40 for receiving bad lengths of the strand 1 is disposed between the delivery roller 12 and the feed roller 10 and the press roller 11. The strand 1 taken out through the delivery roller 12, is fed toward the rotary cutter 7 by the feed roller 10 and the press roller 11 and is thereby cut in to pellets 1a.

Figure 5:
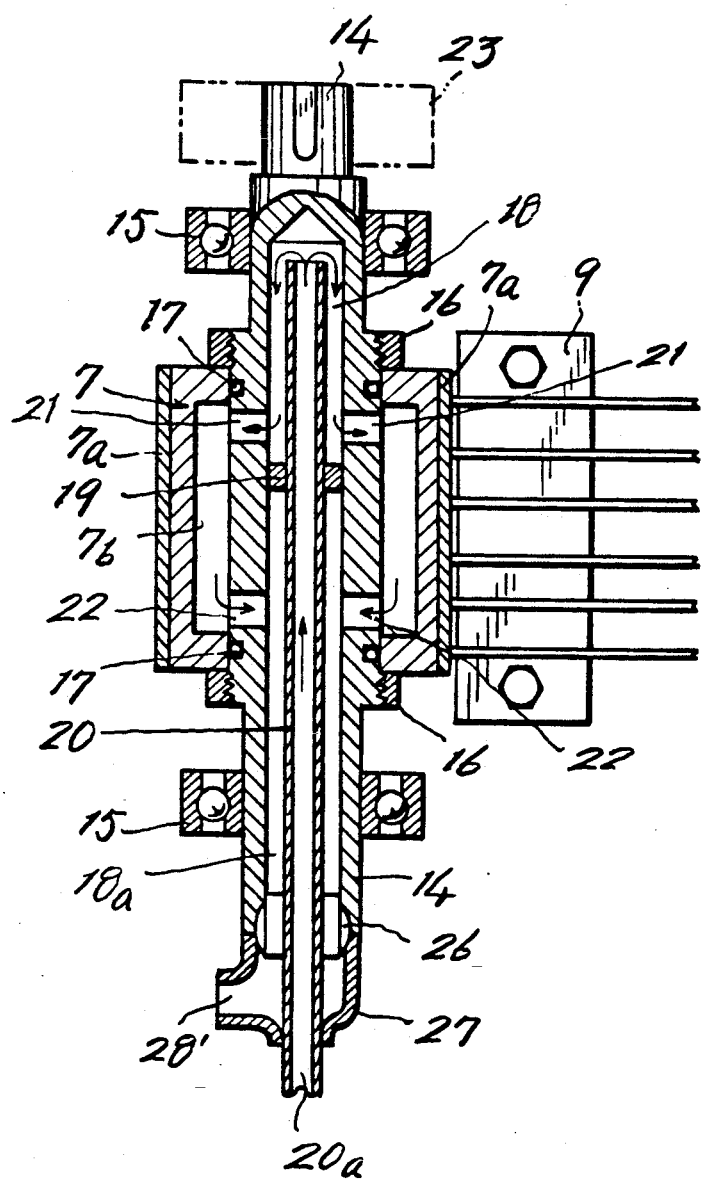
FIG. 5 is an partial enlarged longitudinal cross-sectional view of the rotary cutter portion.
Figure 6:
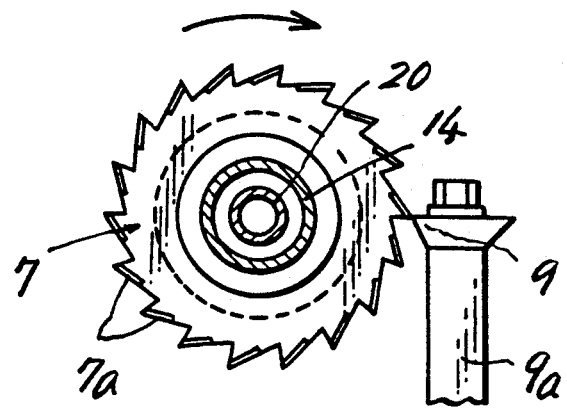
FIG. 6 is an enlarged vertical cross-sectional view of the rotary cutter portion.

The rotary cutter 7 comprises a cutting blade 7a, which is provided with a tooth shaped contour on the outer periphery of the rotary cutter and which is formed by attaching a super hard alloy to a tip end, a hollow rotary shaft 14 is located at the center within the rotary cutter 7 as shown in FIG. 5, and a cooling chamber 7b formed on the outside of the hollow rotary shaft 14. Both ends of the hollow rotary shaft 14 are rotatably journaled by bearings 15.

The rotary cutter 7 is fixed by nuts 16 the hollow rotary shaft 14 having a suitable rotary stop, and O-rings 17 are interposed between the hollow rotary shaft 14 and the rotary cutter 7 to provide sealed connections.

The hollow rotary shaft 14 has a cavity portion closed at one end and opened at the other end. Within this cavity portion is provided a water supply tube 20 opened at a tip end thereof and inserted into the cavity portion with a gap between the tip end of the water supply tube 20 and the closed end of the hollow rotary shaft 14. The water supply tube 20 is supported by a partition wall 19 coated with a smooth nylon resin, etc. in the cavity portion of the hollow rotary shaft 14. The water supply tube 20 has at one end a non-rotary water supply port 20a. The hollow rotary shaft 14 is provided in the cavity portion with a water supply passage 18 and an exhaust passage 18a formed by the partition wall 19, and Inflow holes 21, communicating with the water supply passage 18 at one side of the partition wall 19, and exhaust holes 22 communicating with the exhaust passage 18a at the other side of said partition wall 19, are drilled in given numbers on the hollow rotary shaft 14 corresponding to the cooling chamber 7b of the rotary cutter 7. The hollow rotary shaft 14 is provided at one end with a pulley 23 which is communicated by a belt 25 with a pulley 24, the pulley 24 being rotated by a motor M driven by operation of the operating panel 5a in the pellet making machine 5.

A differently shaped tube 27, such as a T-shaped tube is connected to to the other open end portion of the hollow rotary shaft 14 by a coupling 26, and a water outlet 28' is formed at one side of the differently shape tube 27. Instead of the water outlet 28' another water outlet can be formed by using a rotary joint. Water could also be exhausted through a water exhaust guide, without using a joint, as the water pressure of the exhaust water is quite small. In this case, it is not required to use the differently shaped tube 27.

Figure 2:
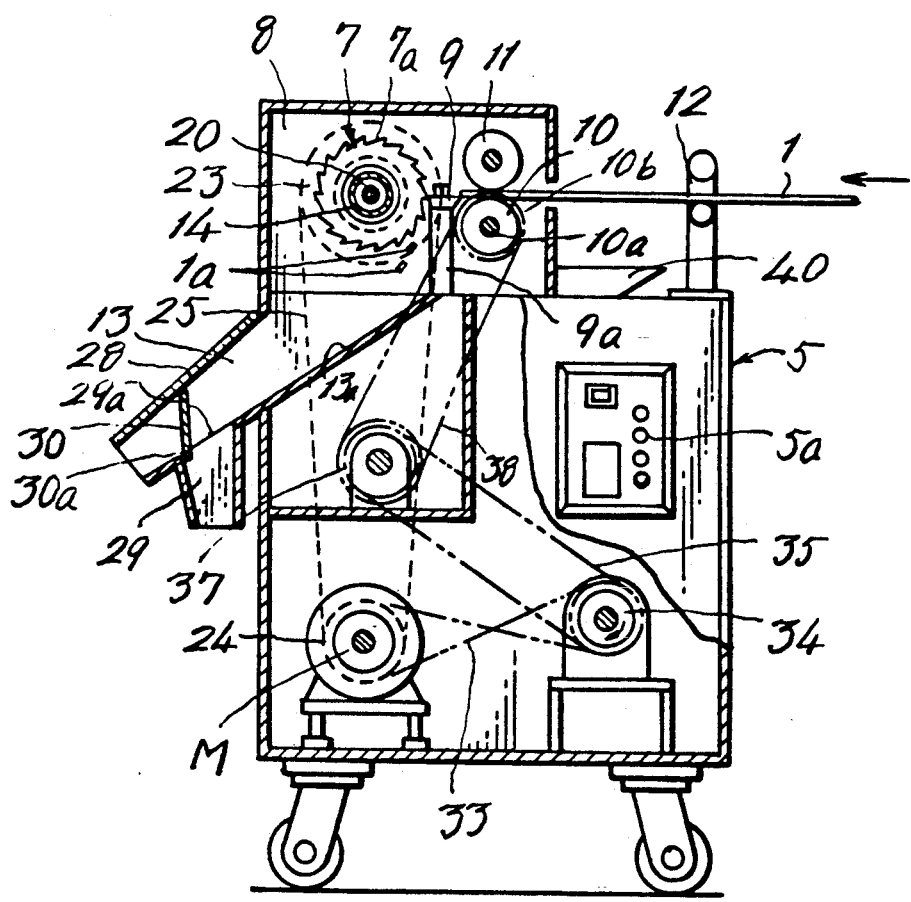
FIG. 2 is a front view of the pellet making machine of FIG. 1, partly broken away, to the interior construction; thereof
Figure 3:
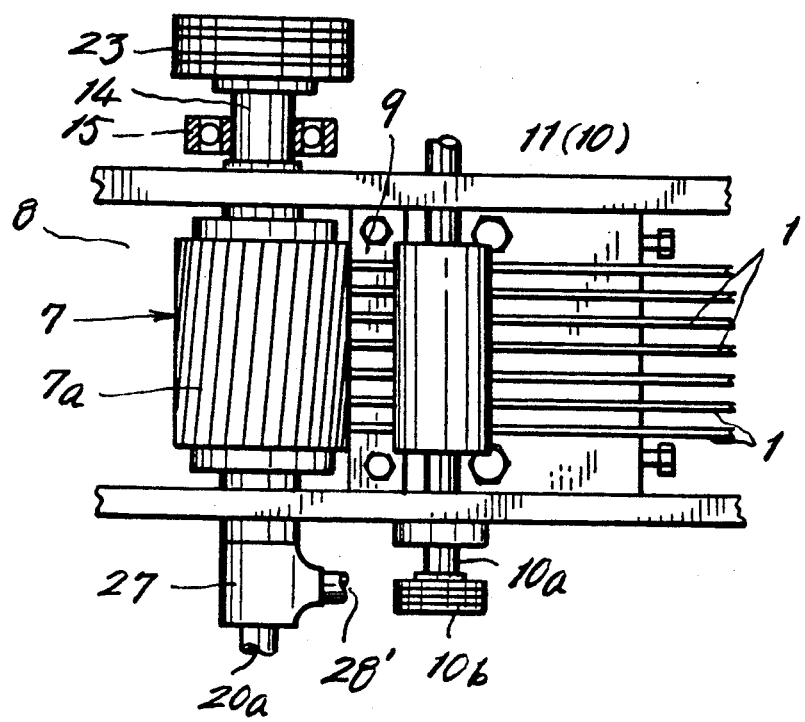
FIG. 3 is a plan view of a rotary cutter portion of the pellet making machine of FIG. 1 parts partially broken away.
Figure 4:
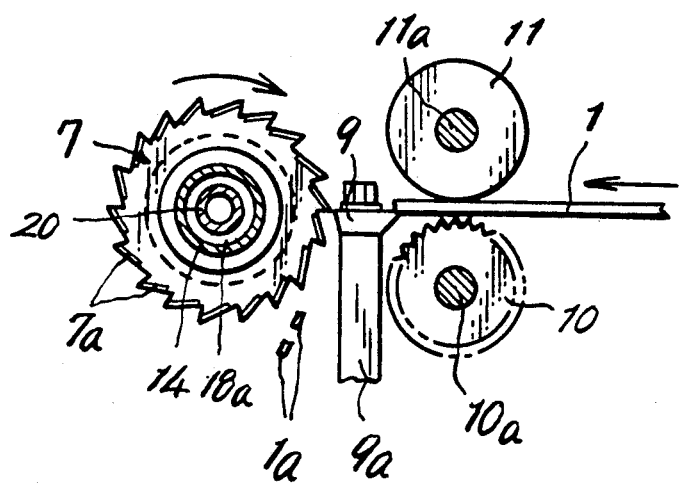
FIG. 4 is a side view of the rotary cutter portion shown in FIG. 3 to illustrating the positional relationship of the rotary cutter with a fixed blade a feed roller and a·press roller.
Figure 7:
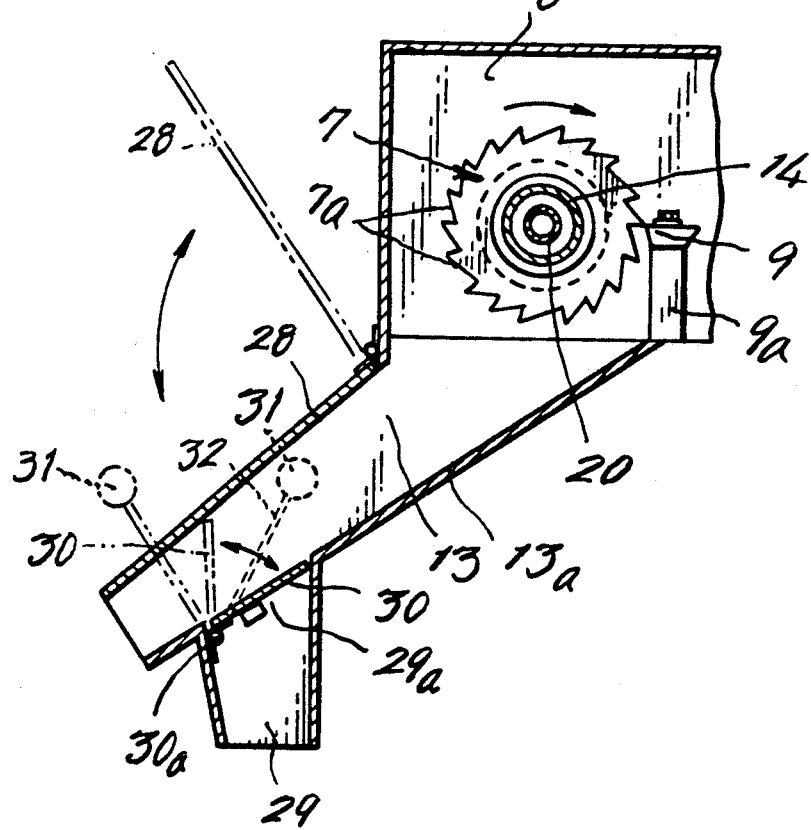
FIG. 7 is a vertical cross-section view of the pellet exhaust chute portion.

The pellet exhaust chute 13 shown in FIG. 2 and FIG. 7 is located the rotary cutter 7 and is provided at a bottom face, with a slant face 13a on which pellets 1a can slide. An open cover 28 is provided above the slant face 13a. A bad material drop cylinder 29 is formed on the lower side of the tip end of the said exhaust chute 13. The bad material drop cylinder 29 is provided at its inlet 29a with a guide cover 30 supported pivotably by a shaft 30a for an opening and closing movement. A supporting arm 32 is connected to the shaft 30a and has a handle 31 which is provided with a weight which holds the closed position and the opened position of the guide cover 30.

The pulley 10b mounted on the rotary shaft 10a of the feed roller 10 is connected by a belt to a pulley 37 which in turn communicates, by a belt 35, with a pulley 34, the pulley 34 being connected via a belt 33 to the pulley motor M.

With the operation of the operating panel 5a on the pellet making machine 5, the pulley 24 is rotated by the motor M, and the rotary cutter 7 is rotated and actuated through rotation of the pulley 23 connected by the belt 25 to rotation of the pulley 24. The pulley 34 is rotated by the belt 33 connecting the pulley 24 to the pulley 34 and the pulley 37 is rotated through the belt 35 connecting the pulley 34 to the pulley 37. By rotating the pulley 37, the pulley 10b of the rotary shaft 10a is rotated, and the feed roller 10 is rotated in a feed direction. Strands 1 fed from the delivery roller 12 are supplied between the fixed blade 9 and the rotary cutter 7 by the lower feed roller 10 and the upper press roller 11 and are cut therebetween. At this time, water is supplied to the rotary cutter 7 from the water supply tube 20, the water flowing into the cooling chamber 7b from the water supply passage 18 via the inflow holes 21 to reduce the temperature of the rotary cutter. The water is then exhausted from the water outlet 28' of the differently shaped 27 via the cooling chamber 7b, the exhaust holes 22, and the exhaust passage 18a. As the pellets 1a cut by the rotary cutter 7 have nonuniform shapes at the first stage of cutting, the cover 30 within the pellet exhaust chute 13 is vertically moved by the handle 31 to close the pellet exhaust chute 13, and is kept in this position by the weight of the handle 31 connected to the supporting arm 22, to drop all the bad pellets 1a into the bad materials drop cylinder 29 and to collect them therein. When pellets 1a become a given shape, the guide cover 30 is returned to the closeed position so as to feed the good pellets only into a pellet collector, namely the rotary type sieve device 6.

As this invention is constituted as above, the strands are cut by the cooled rotary cutter, the pellets are produced by continuous and sure cutting in a predetermined constant shape, and bad pellets are no mixed in with the good pellets, even if bad pellets are produced, so that the control of the product is easy and convenient.

As the hollow rotary shaft is provided in the cavity portion with the partition wall by which the water supply tube is supported in the cavity portion inside the hollow rotary shaft, the partition wall has the advantage in that it is can separate the cooling water passage and the warm water passage. Since the hollow rotary shaft is drilled with the inflow holes and exhaust holes at its outer periphery, and the rotary cutter formed with the cooling chamber in its interior is fixed to the outer periphery of the hollow rotary shaft, the rotary cutter is prevented from heating by the cooling water flowing through the inside of the rotary cutter and conducts good cutting to obtain uniform pellets. The rotary cutter is prevented from heat deformation to to maintain a constant clearance between the rotary cutter and the fixed blade, and the static electricity of the rotary cutter is eliminated for easy handling of the pellets.

As the bad pellet drop cylinder is disposed along the pellet exhaust chute of the pellet making machine, and the guide cover is pivotably mounted for opening and closing movement at the entrance of the upper portion, of the bad pellet drop cylinder the first nonuniform pellets when cutting strands, at the first stage during the operation of the pellet making machine can be easily discriminated by a simple opening and closing operation.

What is claimed is

1. A pellet making machine for producing pellets from a strand, comprising:
   a rotary cutter having a cooling chamber;
   a motor operably connected to said rotary cutter to drive said rotary cutter;
   a fixed blade disposed opposite to said rotary cutter;
   a pellet exhaust chute disposed below said rotary cutter extending downwardly at a slant;
   a hollow rotary shaft having said rotary cutter mounted thereon, said hollow rotary shaft having water inflow holes and water exhaust holes communicating with said cooling chamber of said rotary cutter; and
   a water supply tube extending into said hollow rotary shaft and supported within said hollow rotary shaft by a partition wall defining a water supply passage in said hollow rotary shaft communicating with said water inflow holes and a water exhaust passage in said hollow rotary shaft communicating with said water exhaust holes.

2. The pellet making machine claim 1, wherein said pellet exhaust chute has a slant face, a bad pellet drop cylinder extends downwardly from an opening in said slant face, and a guide cover is pivotably mounted in said pellet exhaust chute so as to be able to open and close said opening in said slant face of said chute.

3. The pellet making machine of claim 2, wherein said guide cover has a handle thereon for operation thereof.

4. The pellet making machine of claim 1, and further comprising:
   a plurality of rollers for delivering a strand to said rotary cutter and said fixed blade.

5. The pellet making machine of claim 4, wherein said plurality of rollers comprises a feed roller and a press roller in contact with said feed roller mounted in front of said rotary cutter and a delivery roller mounted in front of said feed roller and said press roller.

6. The pellet making machine 5, wherein said motor is operably connected to said rotary cutter and said feed roller by a plurality of pulleys and belts.

7. The pellet making machine of claim 1, wherein said cooling chamber is defined by an interior surface of said rotary cutter, said cooling chamber surrounding said hollow rotary shaft.

8. The pellet making machine of claim 7, wherein said water inflow holes and water exhaust holes extend from the interior of said hollow rotary shaft to the exterior thereof at positions spaced along said hollow shaft, said partition wall extending from the exterior surface of said water supply tube to the interior surface of said hollow rotary shaft at a position between said water inflow holes and water exhaust holes.

* * * * *